United States Patent
Dowling (10) Patent No.: US 6,434,186 B2
(45) Date of Patent: *Aug. 13, 2002

(54) PRIORITY CHANNEL SEARCH BASED ON SPECTRAL ANALYSIS AND SIGNAL RECOGNITION

(75) Inventor: Joseph Dowling, San Diego, CA (US)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,406

(22) Filed: Mar. 27, 1998

(51) Int. Cl.$^7$ .......................... H04K 1/00; H04L 27/06
(52) U.S. Cl. ...................................... 375/147; 375/316
(58) Field of Search ................................ 375/130, 224, 375/147, 345, 344, 316; 455/436, 439, 432, 433; 370/335, 342

(56) References Cited

U.S. PATENT DOCUMENTS

| | | | |
|---|---|---|---|
| 5,440,597 A | 8/1995 | Chung et al. | 375/200 |
| 5,491,718 A | 2/1996 | Gould et al. | 375/205 |
| 5,499,386 A | 3/1996 | Karlsson | 455/33.2 |
| 5,548,616 A | 8/1996 | Mucke et al. | 375/295 |
| 5,566,201 A | 10/1996 | Ostman | 375/200 |
| 5,577,022 A | 11/1996 | Padovani et al. | 370/13 |
| 5,621,786 A * | 4/1997 | Fisher et al. | 455/439 |
| 5,629,929 A * | 5/1997 | Blanchard et al. | 370/201 |
| 5,640,385 A * | 6/1997 | Long et al. | 370/335 |
| 5,805,581 A * | 9/1998 | Uchida et al. | 370/335 |
| 5,828,957 A * | 10/1998 | Kroeger et al. | 455/428 |
| 5,920,822 A * | 7/1999 | Houde et al. | 455/433 |
| 5,936,961 A * | 8/1999 | Chiodini et al. | 370/441 |
| 6,009,087 A * | 12/1999 | Uchida et al. | 370/335 |
| 6,009,129 A * | 12/1999 | Kenny et al. | 375/130 |
| 6,205,334 B1 * | 3/2001 | Dent | 455/434 |

FOREIGN PATENT DOCUMENTS

WO    WO 97/05753    2/1997

* cited by examiner

Primary Examiner—Tesfaldet Bocure
(74) Attorney, Agent, or Firm—Perman & Green, LLP; Milan Patel (57) ABSTRACT

A method is disclosed for operating a CDMA mobile station that stores a Preferred Roaming List, as is a mobile station that operates in accordance with the method. The method includes steps of (a) tuning a receiver to an RF channel identified in the Preferred Roaming List; (b) allowing an AGC signal to be generated and settle; (c) sampling and digitizing outputs of In-phase and Quadrature-phase signal channels, and storing the digitized samples; (d) performing a FFT spectral analysis using the stored digitized samples; (e) based at least on a result of the spectral analysis and a value of the AGC signal, determining a likelihood that the RF channel is a CDMA channel; and (f) storing an indication of the likelihood that the RF channel is CDMA channel for use during a system synchronization and acquisition task. Using the technique of this invention those channels that may contain AMPS and TDMA channels, such as GSM channels, can be identified and marked such that they are not later PN searched, or are PN searched with a lower priority than the channels identified as likely being CDMA channels.

12 Claims, 5 Drawing Sheets

PRIORITY CHANNEL SEARCH BASED ON SPECTRAL ANALYSIS AND SIGNAL RECOGNITION

FIELD OF THE INVENTION

This invention relates generally to telecommunications apparatus and, in particular, to radiotelephones that are compatible with a spread spectrum (SS), code division, multiple access (CDMA) protocol.

BACKGROUND OF THE INVENTION

A direct sequence code division spread spectrum communication technique in essence combines two digital signals, or bit streams, to create a third signal prior to transmission. The first signal is an information signal, such as the output of a digitized voice circuit. For example, the first signal may have a bit rate of 10 kb/s. The second signal is generated by a random-sequence, or pseudonoise (PN) generator, and is a stream of essentially random bits having a bit rate that can be several orders of magnitude greater than the bit rate of the digitized voice signal. The modulation of these two signals results in the third signal having the same bit rate as the second signal. However, the third signal also contains the digitized voice signal. When transmitted the information carrying signal is spread over substantially the entire bandwidth (e.g., 1.23 MHz) of the transmission channel. At the receiver an identical random-sequence generator produces a random bit stream which mirrors the original random-sequence that was used for modulation at the transmitter. For proper operation, after carrier frequency demodulation, the PN generator of the receiver must be synchronized to the incoming PN sequence. By removing the random sequence from the received signal and integrating it over a symbol period, a despread signal is obtained. Ideally, the despread signal exactly represents the original digitized voice signal.

In the U.S. digital cellular and PCS systems there are multiple frequency bands, each of which contains multiple channels. Any of these channels can be assigned to different systems; such as CDMA, AMPS or IS-54 (TDMA) in cellular; and CDMA, GSM (TDMA) or IS-136 (also TDMA) in PCS.

When a CDMA mobile station powers on outside of its home area (i.e., is roaming), it must search a number of these channels to find a CDMA channel. However, this can require a significant amount of time, particularly if the list of channels to be searched is large. For example, the time required to search the full PN code space looking for a CDMA signal (e.g. a pilot channel PN sequence) can be as much as 2.5 seconds. The system synchronization or search time can thus be substantial when multiple channels must be examined.

At present a CDMA system specification is being drafted for System Selection for Preferred Roaming (SSPR), referred to as IS-683. This specification improves the system selection procedure by requiring mobile stations to maintain a Preferred Roaming List of channels/SIDs (system identifications). Certain CDMA cellular system operators are also drafting their own specifications for SSPR to optimize the system selection process for their networks. However, in all of these new system selection techniques, as presently understood, the Preferred Roaming List that must be maintained by the mobile station can be large, resulting in possibly excessively long system access times (e.g. minutes). As may be appreciated, many users may find it objectionable to wait some number of minutes after turning on a mobile station before obtaining a CDMA system acquisition and being able to place a call.

OBJECTS AND ADVANTAGES OF THE INVENTION

It is a first object and advantage of this invention to provide an improved system selection procedure for a mobile station.

It is a second object and advantage of this invention to provide a reduced system acquisition time for a roaming mobile station.

It is a further object and advantage of this invention to provide a technique to rapidly prioritize RF channels during a system acquisition procedure, by identifying RF channels having one or more characteristics that are indicative of the RF channel being associated with a desired type of wireless communications system, or conversely by identifying RF channels having one or more characteristics that are indicative of the RF channel being associated with a non-desired type of system.

It is another object and advantage of this invention to provide a significant increase in the speed of synchronization (system selection) of a roaming CDMA mobile station, by prioritizing channel searches based on a spectral analysis of the channels.

SUMMARY OF THE INVENTION

The foregoing and other problems are overcome and the objects and advantages are realized by system search methods and apparatus in accordance with embodiments of this invention.

This invention has grown out of a realization by the inventor that if RF channels that contain signals from other, non-desired, systems are assigned a low priority during the system search procedure, then the average acquisition time, when roaming, can be significantly reduced.

An aspect of this invention is a significant increase in the speed of synchronization (system selection) of a CDMA mobile station when roaming, by prioritizing channel searches based on a spectral analysis of channels. The spectral analysis is used to recognize if a particular channel contains a signal other than a CDMA signal (e.g. contains instead a TDMA or a FDMA signal). This information is then used to determine which channels are more likely to be CDMA channels, and to search these channels first (i.e., with a higher priority), or to only search these channels.

In performing the spectral analysis a receiver automatic gain control (AGC) signal is preferably first allowed to settle to a steady state value. Further in accordance with this invention the level to which the AGC signals settles may be used as additional information as to whether there is a CDMA signal present in the channel being spectrally analyzed.

The time required to perform the spectral analysis (e.g., a FFT analysis) of a particular channel is at least an order of magnitude less than the time required to search the full PN code space for a CDMA signal (e.g., 50 mS as compared to 2.5 secs). The use of the teaching of this invention is thus very beneficial in a PCS type of CDMA mobile station, where there are a large number of bands/channels to search when roaming.

The teachings of this invention improves over conventional techniques by using the spectral analysis information to prioritize the channels to be searched. A signal recognition function assigns each channel a rating or search priority, depending on the result of the spectral analysis which may be used alone, or in combination with one or more other indicators, such as the level of the receiver AGC.

In accordance with a presently preferred embodiment a method is disclosed for operating a CDMA mobile station that stores a Preferred Roaming List, as is a mobile station that operates in accordance with the method. The method includes steps of (a) tuning a receiver to an RF channel identified in the Preferred Roaming List; (b) allowing an AGC signal to be generated and to settle; (c) sampling and digitizing outputs of In-phase and Quadrature-phase signal channels, and storing the digitized samples; (d) performing a FFT spectral analysis using the stored digitized samples; (e) based at least on a result of the spectral analysis and a value of the AGC signal, determining a likelihood that the RF channel is a CDMA channel; and (f) storing an indication of the likelihood that the RF channel is CDMA channel for use during a system synchronization and acquisition task.

Using the technique of this invention those channels that may contain AMPS and TDMA channels, such as GSM channels, can be identified and marked such that they are not later PN searched, or are PN searched with a lower priority than the channels identified as likely being CDMA channels.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
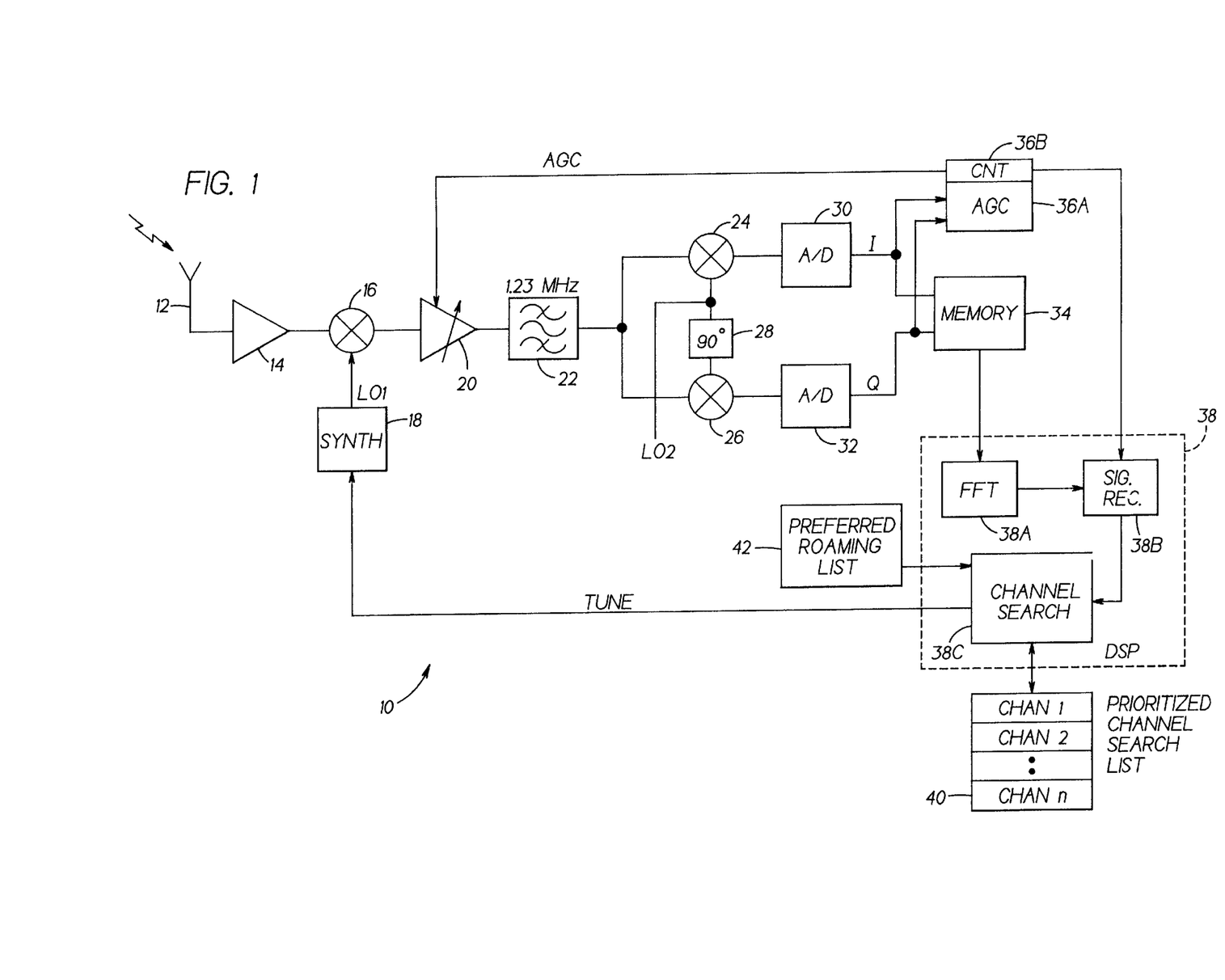
FIG. 1 is a simplified block diagram of a CDMA radio telephone or mobile station that is constructed and operated in accordance with this invention.

Reference is made to FIG. 1 for showing a block diagram of an embodiment of a mobile station 10, such as cellular telephone or a personal communicator, that is constructed and operated in accordance with this invention. Only those portions, such as the receiver, of the mobile station 10 that are germane to an understanding of this invention are illustrated. An antenna 12 receives RF signals that are transmitted by one or more base stations or base sites (not shown). Connected to the antenna 12 is a low noise amplifier (LNA) 14 having an output connected to a downconversion mixer 16. In the mixer 16 the received RF signal is mixed with a first local oscillator signal (LO1) that is output from a programmable frequency synthesizer 18. The output of the mixer 16 is the first intermediate frequency (IF). This signal is then amplified by a gain controlled amplifier 20 and the amplified signal is band pass filtered in filter block 22. In the presently preferred embodiment of this invention, i.e. a CDMA embodiment, the filter 22 has a 1.23 MHz bandpass characteristic corresponding to the 1.23 MHz CDMA channel bandwidth. The filtered signal is next applied to In-phase and Quadrature-phase (IQ) mixers 24 and 26 where the signal is mixed to baseband with a second local oscillator signal (LO2). A 90 degree phase shift element 28 provides the necessary quadrature relationship between the two baseband channels. The magnitudes of the I and Q channels are repetitively sampled and converted to corresponding digital signals in A/D converters 30 and 32, respectively. A suitable sampling rate is at the CDMA chip rate, or 1.23 MHz. The IQ digital samples are stored in a memory 34, which may be a high speed RAM that forms a portion of the normal PN code space searcher function. The digitized IQ signals are also input to a receiver automatic gain control (AGC) block 36A that includes an AGC counter (CNT) 36B. The AGC counter 36B is selectively incremented and decremented as a function of the received signal strength, and the AGC counter value is used to generate a receiver AGC signal for controlling the gain of the amplifier 20, in a conventional fashion.

Reference can be had to the following commonly assigned U.S. patents for teaching AGC and PN searcher embodiments that can be used in the mobile station 10 of FIG. 1: U.S. Pat. No. 5,440,597, issued Aug. 8, 1995, "Double Dwell Maximum Likelihood Acquisition System with Continuous Decision Making for CDMA and Direct Spread Spectrum System", by S. Chung et al., and U.S. Pat. No. 5,556,201, issued Oct. 15, 1996, "Digital AGC for a CDMA Radiotelephone", by J. Östman. The teachings of these two U.S. patents are incorporated by reference herein in their entireties.

In accordance with the teaching of this invention a mobile station processor, such as a digital signal processor (DSP) 38, is connected to the memory 34 and the AGC counter 36B for processing the resulting signals. In the preferred embodiment of this invention the DSP 38 includes a spectral analyzer embodied as a Fast Fourier Transform (FFT) block 38A. The teachings of this invention are not, however, limited to only the use of the FFT for performing spectral analysis. The FFT block 38A receives the IQ samples from the memory 34 and performs a FFT analysis on same in accordance with any suitable FFT technique. An output of the FFT block 38A is provided to a signal recognizer block 38B which optionally also receives an input from the AGC counter 36B. The purpose of the signal recognizer block 38B is to determine whether a particular channel (having a 1.23 MHz bandwidth) to which the receiver is tuned exhibits characteristics that are indicative of the channel being a CDMA channel. An output of the signal recognizer 38B is coupled to a channel searcher block 38C which provides a tuning signal to the synthesizer 18 whereby the receiver can be tuned to a desired forward channel. The blocks 38A, 38B and 38C cooperate to scan through a range of frequencies in a channel by channel manner in order to determine a probability that a particular channel is a desired CDMA channel. In this manner the channel searcher block 38C is enabled to form a prioritized list of channels 40 for performing PN code space searching (Sync Acquisition). The output of the AGC counter 36B can be used to facilitate the channel analysis and selection function performed by the channel recognizer block 38B.

It should be realized that while shown as discrete blocks within the DSP; the FFT, signal recognizer, and channel searcher blocks 38A–38C may be implemented in whole or in part by programs executed by the circuitry of the DSP 38, either alone or in cooperation with high speed hardware support devices.

What is thus disclosed herein is a technique for performing a spectral analysis on a list of forward channels, such as channels specified in a Preferred Roaming List 42, during System Selection, and prior to Sync Acquisition. The spectral analysis allows signals other than CDMA (e.g., TDMA & FDMA) to be recognized within the bandwidth of a given channel, and such channels may then be assigned a lower search priority during the Sync Acquisition phase, or may be eliminated from the search entirely. On average, the use of the teaching of this invention will increase the speed of the system selection process when the mobile station 10 is roaming.

Spectral analysis, more particularly FFT, involves acquiring "raw" In-phase and Quadrature-phase samples directly from the A/Ds 30 and 32, and performing a complex FFT on the samples. This can be done by copying blocks of I and Q samples from the A/Ds 30, 32 to a block of memory, where the samples can be read by the DSP 38.

A number of different techniques can be used by the signal recognizer block 38B to determine if the output of the FFT block 38A indicates the characteristics of an AMPS or a TDMA, such as a GSM, signal.

Figure 2A:
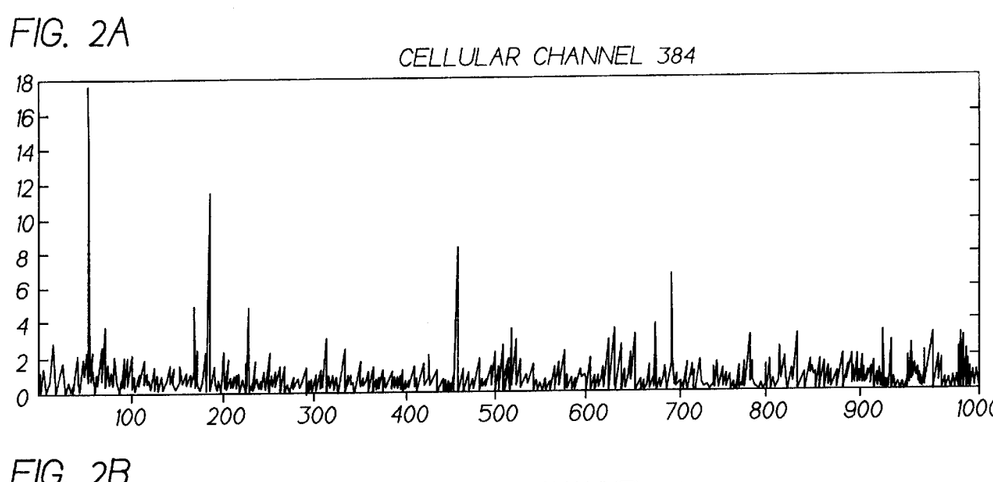
FIGS. 2A and 2B are exemplary spectrum showing the results of FFT operations performed on two cellular channels that happen to contain AMPS channels.
Figure 2B:
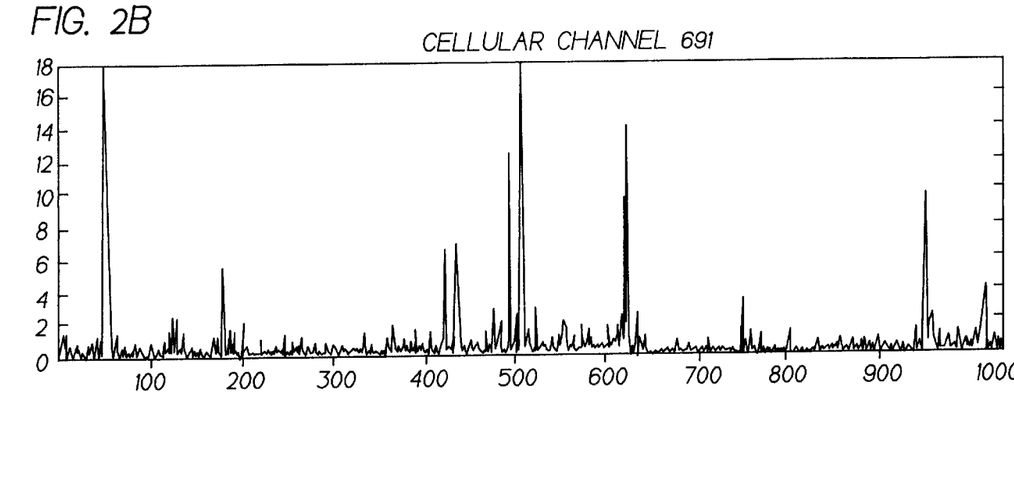

FIGS. 2A and 2B are exemplary spectra showing the results of FFT operations performed on two cellular channels (384 and 691) that happen to contain AMPS channels. The bandwidth of each of the AMPS channels is 30 KHz. Furthermore, since the AMPS system uses a frequency modulation (FM) technique wherein the actual channel carrier frequency varies with time, the resulting spectrum (which may be thought of as a 'snapshot' of the RF energy at a given instant in time) exhibits a plurality of sharply defined peaks that are distributed across the 1.23 MHz bandwidth of the CDMA channel, where each peak corresponds to one AMPS forward channel.

Figure 3A:
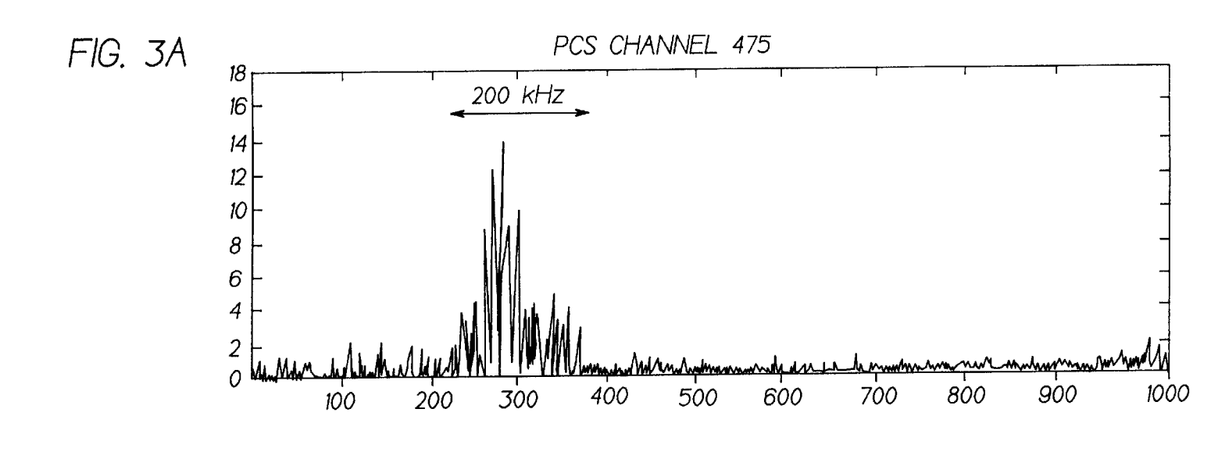
FIGS. 3A and 3B illustrate exemplary spectrum showing a result of FFT operations performed on a PCS channel that includes a TDMA-type channel, in particular a GSM broadcast control channel.
Figure 3B:
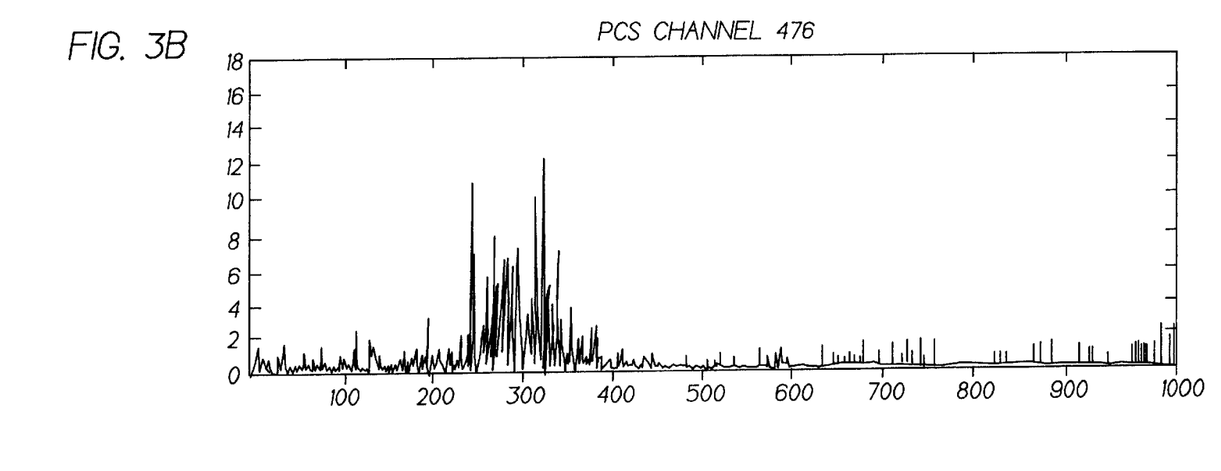
Figure 3C:
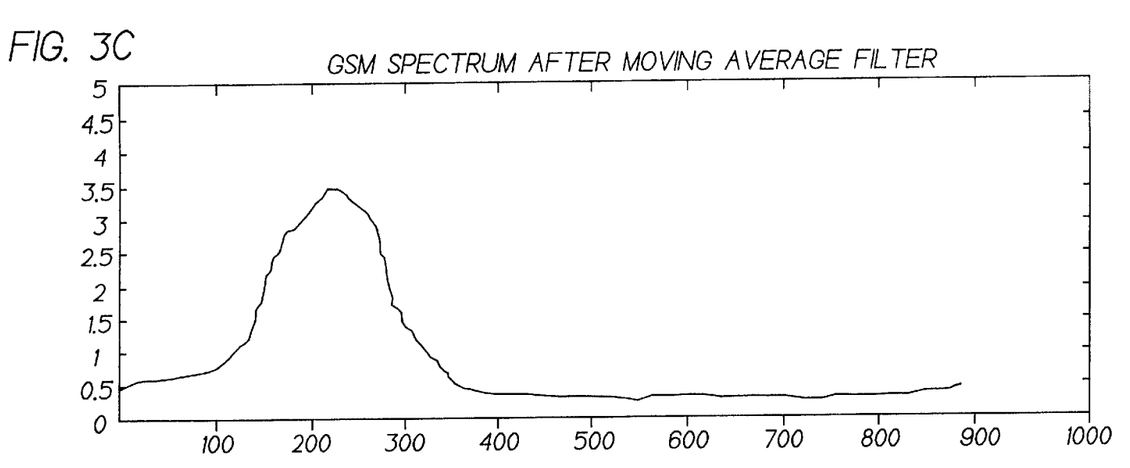
FIG. 3C illustrates the result of applying a moving average filter to the spectrum shown in FIG. 3A.
Figure 4:
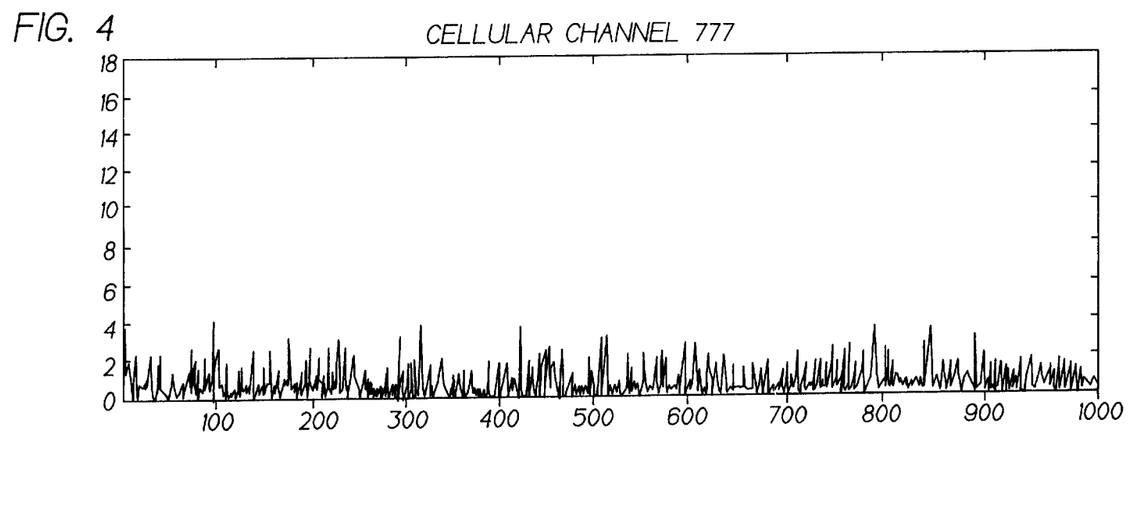
FIG. 4 illustrates an exemplary spectrum showing the result of the FFT operation performed on a desired CDMA channel.

FIGS. 3A and 3B illustrate exemplary spectra showing a result of FFT operations performed on a PCS channel (475) that includes a TDMA-type channel, in particular a GSM broadcast control channel (bandwidth 200 KHz), while FIG. 3C illustrates the result of applying a moving average filter to the spectrum shown in FIG. 3A to locate the signal energy peak. On the plots shown a portion of another GSM channel is just visible in bins 1000 to 1024 of the FFT, which may have been a GSM call that was in progress at that time.

In contrast to the spectra shown in FIGS. 2A, 2B, 3A and 3B, FIG. 4 illustrates an exemplary spectrum showing the result of the FFT operation performed on the desired type of CDMA channel (cellular channel 777).

In addition to the use of the moving average filter technique shown in FIG. 3C, another suitable and presently preferred technique searches for n peaks in the spectrum and compares the average level of the n peaks to the average level of the noise floor of the FFT. The calculations can be performed in accordance with the following algorithm, where x(k)=FFT spectrum and L=the length of the FFT.

Find N largest peaks in accordance with:

peaks=sum of the N largest peaks in the spectrum.

Next compute the average level of the noise floor and subtract the peaks:

$$\text{Noise\_floor}_{FFT} = 1 \Big/ (L-N) \left[ \sum_{k=0}^{L-1} (x[k]) - \text{peaks} \right]$$

Next compare the peaks to the value of the noise floor to obtain a ratio of peak energy to noise floor energy:

Ratio=(peaks/N)/$\text{Noise\_floor}_{FFT}$.

Before the received signal is sampled the AGC signal is preferably given sufficient time to settle. Further in accordance with the teaching of this invention the level at which the AGC settles can be used as additional information to identify whether a channel under investigation has the characteristics associated with a CDMA channel. For example, if the AGC settles at a level above about −90 dBm, and if the spectrum is substantially flat (as in FIG. 4), then the signal recognizer block 38B can declare to the channel searcher block 38C, with a high probability, that the channel is a CDMA channel.

It is noted that the spectra illustrated in FIGS. 2A, 2B, 3A, 3B and 4 were obtained by acquiring actual channels using CDMA radiotelephones, and then processing the samples using a commercially available FFT program that executes on a workstation. However, the results are not expected to differ in any significant sense when the FFT calculations are performed by the DSP 38.

It can be seen in FIGS. 2A and 2B that the AMPS signals are easily recognizable in the spectrum. The ratio calculation, as defined above, was found to yield a result of 17.8 for FIG. 2A and 79.4 for FIG. 2B. The AGC counter value (hexadecimal) was found to be 0x2D1 (FIG. 2A) and 0x224 (FIG. 2B), which correspond to AGC values of −90.2 dBm and −68.5 dBm, respectively.

It can be seen in FIGS. 3A and 3B that the GSM signal is also easily recognizable in the spectrum. The ratio calculation was found to yield 21.8 for FIG. 3A and 18.9 for FIG. 3B. The AGC counter value (hexadecimal) was found to be 0x35E (FIG. 3A) and 0x370 (FIG. 3B), which correspond to AGC values of −107.8 dBm and −110 dBm, respectively.

The CDMA channels were measured using the same criteria as the other channels. As can be expected from the nature of the CDMA band-spread transmission, these spectra (see FIG. 4) are relatively flat in comparison to the previously described AMPS and GSM spectra. This relative spectral flatness is reflected in a smaller ratio value (e.g., 5.6 for the spectrum shown in FIG. 4). The AGC counter value (hexadecimal) was found to be 0x248, which corresponds to an AGC value of −73 dBm. The AGC value is thus significantly different (at least by about 20 dBm) from the values obtained for the channels containing AMPS and GSM transmissions, and is also significantly different than would be the case if the channel were empty, that is, contained no transmitted RF energy.

As may be appreciated, the foregoing technique is most effective when a signal is present. If there is no signal in the channel being analyzed then the resulting spectrum will be substantially flat, and will resemble the CDMA spectrum. However, including the use of the AGC information in the algorithm helps this situation so long as the CDMA signal is of sufficient magnitude to generate a usable AGC value.

Another consideration is the presence of intermodulation interference in the CDMA channel being analyzed, although this is more likely to present a problem in the cellular band and not the PCS band (as yet). Intermodulation interference occurs when the front end of the receiver (Low Noise Amplifier and Mixer) goes into non-linear operation. This is caused by high power out of band signals, which mix and produce in-band interference. By switching the LNA off, the intermodulation interference is reduced. If this presents a problem, then the front-end gain can be reduced which in turn will reduce or eliminate the intermodulation interference.

Figure 5:
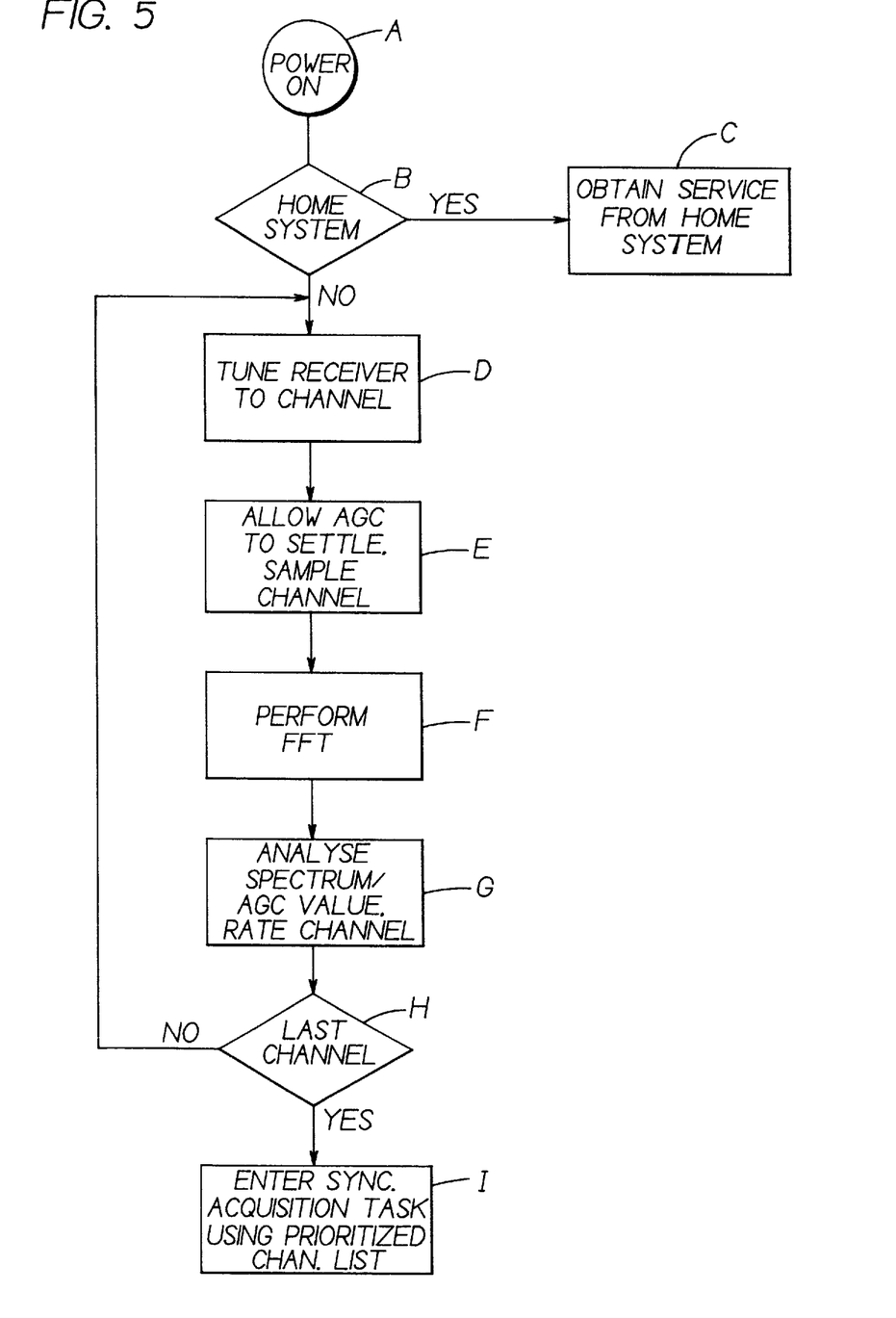
FIG. 5 is a logic flow diagram that illustrates a method in accordance with the teaching of this invention.

Referring to FIG. 5, there is illustrated a logic flow diagram of a method in accordance with this invention. At Step A the mobile station 10 is powered on and at Step B the mobile station makes a determination as to whether its home system is available. This can be accomplished in accordance with conventional techniques, such as by scanning the last used channel. If the home system is available the method proceeds to Step C where the mobile station 10 obtains service from the home system. If the home system is not available, that is the mobile station 10 is roaming, the method proceeds to Step D where the synthesizer 18 is tuned to the first channel of a set of candidate channels to be searched, such as the Preferred Roaming List 42 of channels. As was mentioned previously, there may be anywhere from a few channels to several tens of channels stored in the Preferred Roaming List 42, depending on the service provider. Also, and depending on the current location of the mobile station 10, only a few of these channels may actually be a valid CDMA channel. At Step E the AGC circuit 36A is allowed to settle, the IQ signals are sampled and the raw values are stored in the memory 34. At Step F the FFT block 38A performs the FFT operation on the sampled channel values. At Step G the signal recognizer block 38B operates on the FFT data to analyze the resulting FFT spectrum and to make a determination as to the priority of the channel being analyzed, based on the analyzed spectrum and optionally on at least one other criterion, such as the AGC value. By example, the analyzed channel can be given a rating for indicating how closely it approaches the characteristics of an "ideal" CDMA channel, and this information is then stored in the prioritized channel search list 40. Alternately, the channel information may be stored in the channel list 40 only if the channel characteristics indicate that the channel being analyzed has a high probability of being a CDMA channel, thereby filtering out those channels of lower probability. A channel that is deemed likely to not be a CDMA channel can also simply be flagged in the prioritized channel search list 40 so that it is subsequently skipped during the Sync Acquisition process. At Step H a determination is made if the last channel of the set of channels to be analyzed has been processed. If further channels remain, then the method proceeds back to Step D to analyze the next channel. If all of the channels of the channel set have been analyzed, the method proceeds to Step I to enter the Sync Acquisition Task using the prioritized channel search list 40. In this case the Sync Acquisition process will examine the PN code space for only those channels that have a high probability of being CDMA channels, thereby significantly reducing an amount of time required to acquire a suitable CDMA channel.

It can be appreciated that the prioritized channel search list 40 may be combined with the Preferred Roaming List 42, such as by providing a read/write field for each channel entry in the Preferred Roaming List 42 for storing the priority calculated by the signal recognizer block 38B.

Although described above in the context of a CDMA compatible mobile station, it should be realized that the teachings of this invention can be used by other types of mobile stations. For example, a GSM mobile station could employ the same techniques to identify channels that most probably are GSM channels (as indicated in FIGS. 3A–3C) and to eliminate those channels having AMPS characteristics (FIGS. 2A and 2B). It will be realized that in the exemplary GSM embodiment the bandpass filter 22 will most likely have a 200 KHz pass band characteristic within which one or several narrower band AMPS signals may be located.

Further in regard to the usefulness of the teachings of this invention, so-called third generation wideband CDMA (W-CDMA) systems are expected to be deployed in the early part of the next decade, and the current second generation systems (IS-136, DCS1900, GSM, PDC) will still be operational. This implies that a W-CDMA mobile station will have to perform a system determination task similar to the current system determination performed by IS-95 compatible mobile stations. The signal recognition algorithm described herein can be applied to any mobile station which has a receiver with a bandwidth wide enough to be able to recognize other signals of a smaller bandwidth. The signal recognition in a W-CDMA mobile can be used in a similar manner to recognize non-CDMA channels and to assign a low search priority to these channels. It should also be noted that the wider the bandwidth of the receiver, the more information that can be obtained about the frequency spectrum.

In order to employ the spectra analysis in a W-CDMA mobile station, the sampling rate is increased to cover the wider bandwidth. The length of the FFT is also increased to achieve the same resolution. In the current proposals for the U.S. W-CDMA, the channels are 3.6864 MHz wide (i.e., 3 * IS95 BW).

The U.S. W-CDMA proposals require backward compatibility with the current IS-95 CDMA systems. This means that W-CDMA mobile stations will be capable of operating on the new W-CDMA systems, however if W-CDMA service is not available then the mobile station can acquire service on an IS-95 system. The signal recognition algorithm described herein can be used to identify IS-95 CDMA channels within the W-CDMA bandwidth. This information can then be used in two ways: firstly, the W-CDMA compatible mobile station can assign these channels a low priority when searching for W-CDMA service; secondly, if the W-CDMA search fails, then the information from the previous spectral analysis can be used to determine on which channels to most likely find IS-95 CDMA service.

It should thus be further realized that the teachings of this invention are not to be construed so as to be limited to only the specific frequencies, bandwidths, numbers of samples and the like that were described above. For example, more or less than a 1024 point FFT can be performed, with a corresponding increase or decrease in resolution. By example, if the A/D converters are sampled at twice the chip rate (2.46 MHz) then the resolution can be increased to a bandwidth of 2.46 MHz. While this may not be advantageous if the fixed 1.23 MHz bandpass filter 22 is employed, the use of a tuneable bandpass filter (having a wider pass band) may make the use of the higher sampling rate desirable. If a wider BW is taken, then the edges of the 1.23 MHz Band would become visible.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a CDMA mobile station that stores a Preferred Roaming List, comprising the steps of:

tuning a receiver to an RF channel identified in the Preferred Roaming List;

allowing an AGC signal of the receiver to be generated and settle;

sampling and digitizing outputs of In-phase and Quadrature-phase signal channels of the receiver, and storing the digitized samples;

performing a FFT spectral analysis using the stored digitized samples; and based at least on a result of the spectral analysis and a value of the AGC signal, determining a likelihood that the RF channel is a CDMA channel for use during a system synchronization and acquisition task.

2. A method as in claim 1, wherein the step of determining a likelihood that the RF channel is a CDMA channel includes steps of:

obtaining a FFT spectrum given by x(k), where a FFT length is given by L;

find N largest peaks in accordance with peaks=sum of N largest peaks in spectrum;

computing an average level of a noise floor and subtracting the peaks in accordance with:

$$\text{Noise\_floor}_{FFT} = \frac{1}{(L-N)}\left[\sum_{k=0}^{L-1}(x[k]) - \text{peaks}\right]$$

comparing the peaks to the value of the noise floor to obtain a ratio of peak energy to noise floor energy in accordance with:

Ratio=$(peaks/N)/Noise\_floor_{FFT}$;

and determining the likelihood based on the obtained ratio and on the AGC value.

3. A CDMA mobile station that stores a Preferred Roaming List, comprising:

a receiver that is tunable to an RF channel identified in the Preferred Roaming List, the receiver comprising circuitry for downconverting the received signal to baseband signals;

circuitry for generating an AGC signal from the baseband signals;

a converter for sampling and digitizing the baseband signals;

a memory for storing the digitized baseband signals;

means coupled to said memory for generating a frequency spectrum from the stored digitized baseband signals; and an RF channel analysis means for determining a likelihood that the RF channel is a CDMA channel based at least on the generated frequency spectrum and a value of the AGC signal, said analysis means storing an indication of the likelihood that the RF channel is CDMA channel for use during a system synchronization and acquisition task.

4. A mobile station as in claim 3, wherein the received RF signal is downconverted to In-phase and Quadrature-phase baseband signals, and further comprising a first A/D converter for sampling and digitizing the In-Phase baseband signal and a second A/D converter for sampling and digitizing the Quadrature-phase baseband signal.

5. A mobile station as in claim 4, wherein said first and second A/D converters sample and digitized the baseband signals at a chip rate or at a multiple of the chip rate.

6. A mobile station as in claim 3, wherein said frequency spectrum generating means comprises FFT determination means, wherein a FFT spectrum is given by x(k), wherein a FFT length is given by L, and wherein said analysis means determines a likelihood that the RF channel is a CDMA channel in accordance with the following algorithm:

find N largest peaks in accordance with peaks=sum of N largest peaks in spectrum;

computing an average level of a noise floor and subtracting the peaks in accordance with:

$$\text{Noise\_floor}_{FFT} = \frac{1}{(L-N)}\left[\sum_{k=0}^{L-1}(x[k]) - \text{peaks}\right]$$

comparing the peaks to the value of the noise floor to obtain a ratio of peak energy to noise floor energy in accordance with:

Ratio=$(peaks/N)/Noise\_floor_{FFT}$;

and determining the likelihood based on the obtained ratio and on the AGC value.

7. A mobile station as in claim 3, wherein said mobile station is compatible with a wideband CDMA system.

8. A mobile station as in claim 7, wherein said channel analysis means determines a likelihood that the RF channel contains a narrower band CDMA channel.

9. A method for operating a mobile station, comprising the steps of:

tuning a receiver to an RF channel;

performing a spectral analysis of the RF channel; and based at least in part on the result of the spectral analysis, determining if the RF channel is a desired type of RF channel on which to attempt a system access, the step of determining further comprising the steps of:

obtaining a FFT spectrum given by x(k), where a FFT length is given by L;

finding N largest peaks in accordance with:

peaks =sum of N largest peaks in spectrum;

computing an average level of a noise floor and subtracting the peaks in accordance with:

$$\text{Noise\_floor}_{FFT} = \frac{1}{(L-N)}\left[\sum_{k=0}^{L-1}(x[k]) - \text{peaks}\right]$$

comparing the peaks to the value of the noise floor to obtain a ratio of peak energy to floor energy in accordance with:

Ratio=$(peaks/N)/Noise\_floor_{FFT}$;

and rating the RF channel based at least in part on the obtained ratio.

10. A method as in claim 9, wherein the step of rating further considers a value of an AGC signal for the RF channel.

11. The method according to claim 10 wherein a likelihood that the mobile station is a CDMA mobile station is determined.

12. The method according to claim 9 wherein a likelihood that the mobile station is a CDMA mobile station is determined.

* * * * *